United States Patent
Kishioka et al.

(10) Patent No.: US 7,986,109 B2
(45) Date of Patent: Jul. 26, 2011

(54) LOAD DRIVING CIRCUIT AND METHOD OF SETTING LOAD CURRENT THEREOF

(75) Inventors: Toshiki Kishioka, Osaka (JP); Yohichi Shiwaya, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 381 days.

(21) Appl. No.: 12/375,949

(22) PCT Filed: May 14, 2008

(86) PCT No.: PCT/JP2008/059301
§ 371 (c)(1),
(2), (4) Date: Feb. 2, 2009

(87) PCT Pub. No.: WO2008/155971
PCT Pub. Date: Dec. 24, 2008

(65) Prior Publication Data
US 2009/0261753 A1    Oct. 22, 2009

(30) Foreign Application Priority Data
Jun. 18, 2007 (JP) ................. 2007-159879

(51) Int. Cl.
G05F 1/00 (2006.01)
H05B 37/02 (2006.01)
H05B 39/04 (2006.01)
H05B 41/36 (2006.01)

(52) U.S. Cl. ................ 315/302; 315/291; 315/209 R; 315/308

(58) Field of Classification Search ................ None
See application file for complete search history.

(56) References Cited

U.S. PATENT DOCUMENTS

| | | | |
|---|---|---|---|
| 6,362,578 B1 * | 3/2002 | Swanson et al. | 315/307 |
| 7,307,385 B2 * | 12/2007 | Yamamoto et al. | 315/224 |
| 2005/0231127 A1 | 10/2005 | Yamamoto et al. | |
| 2006/0082529 A1 | 4/2006 | Oyama | |
| 2009/0108775 A1 * | 4/2009 | Sandner et al. | 315/297 |

FOREIGN PATENT DOCUMENTS

| | | |
|---|---|---|
| JP | 2005-184900 | 7/2005 |
| JP | 2005-318787 | 11/2005 |
| JP | 2006-140438 | 6/2006 |
| JP | 2006-141184 | 6/2006 |
| JP | 3904579 | 1/2007 |

* cited by examiner

Primary Examiner — Anh Q Tran
(74) Attorney, Agent, or Firm — Cooper & Dunham LLP

(57) ABSTRACT

A load driving circuit is disclosed that allows a charge pump circuit to operate at an optimum step-up ratio without frequently changing the step-up ratio. The load driving circuit includes a step-up circuit; a current setting circuit that sets a value of an electric current to be supplied to a load; a constant current circuit generating a constant electric current having the set value; a determination circuit; and a control circuit. In response to a load current setting signal, the current setting circuit sets the electric current to be maximum, and decreases the electric current step by step down to a preset value. Each time the electric current is decreased by one step, the control circuit changes the step-up ratio according to the determination results of the determination circuit, until the constant current circuit supplies the set electric current.

18 Claims, 7 Drawing Sheets

LOAD DRIVING CIRCUIT AND METHOD OF SETTING LOAD CURRENT THEREOF

TECHNICAL FIELD

The present invention relates to a load driving circuit that supplies an electric current to a load formed of one or more light emission diodes to drive the load, and a method of setting a load current of the load driving circuit, and particularly, to a load driving circuit using a charge pump circuit of a variable step-up ratio as a power supply for driving the load, and a method of setting the load current of the load driving circuit.

BACKGROUND ART

In recent years, white color light emission diodes have become widely used as backlights of a portable apparatus having a liquid display device (LCD), like mobile phones or digital cameras. A driving voltage of a white color light emission diode is 3.4 Volts to 3.7 Volts, whereas a driving voltage of a lithium-ion cell, which is frequently used as the power supply of a portable apparatus, is 3.5 Volts to 4.2 Volts. Since the driving voltage of the white color light emission diode is close to the driving voltage of the lithium-ion cell acting as the power supply, in order to drive the white color light emission diode for a long time period, it is necessary to use a step-up circuit (booster) like a charge pump circuit to boost the voltage of the power supply.

For example, Japanese Laid Open Patent Application No. 2006-187187 (below, referred to as "reference 1") discloses a configuration of a power supply device in the related art able to appropriately set a step-up ratio (or boost ratio) of a charge pump circuit so as to supply a constant current to a light emission diode.

FIG. 7 is diagram illustrating a configuration of a power supply device in the related art as disclosed in reference 1.

In a power supply device 100 as shown in FIG. 7, a light emission diode 110 acting as a load is driven by a constant current supplied by a constant-current circuit 101. A monitoring circuit 102 monitors a voltage Vled of a connection portion between the constant-current circuit 101 and the light emission diode 110, and the monitoring circuit 102 has a voltage source (not illustrated) which generates a threshold voltage Vth following variation of a voltage enabling constant operations of the constant-current circuit 101.

The monitoring circuit 102 compares the threshold voltage Vth generated by the voltage source with the voltage Vled, and when a state in which the voltage Vled is lower than the threshold voltage Vth continues for a certain time period, a comparison result signal Ss is output to a controller 103.

The controller 103 increases a step-up ratio of the charge pump circuit 104 based on the comparison result signal Ss from the monitoring circuit 102; thus the voltage Vled is adjusted to have a value enabling constant operations of the constant-current circuit 101, and this allows the light emission diode 110 to be driven by a constant current.

In FIG. 7, the voltage of the battery 111 acting as a power supply decreases gradually along with usage, and hence, in FIG. 7, the step-up ratio of the charge pump circuit 104 is allowed to be variable from a low value to a high value. For this reason, when the state in which the comparison result signal Ss from the monitoring circuit 102 is at a low level, that is, the voltage Vled is lower than the threshold voltage Vth, continues for a certain time period, the controller 103 increases the step-up ratio of the charge pump circuit 104 by one level.

For example, when the charge pump circuit 104 is operating with the step-up ratio of one, if the comparison result signal Ss from the monitoring circuit 102 becomes the low level, the controller 103 increases the step-up ratio of the charge pump circuit 104 to 1.5. Similarly, when the charge pump circuit 104 is operating with the step-up ratio of 1.5, when the comparison result signal Ss from the monitoring circuit 102 becomes the low level, the controller 103 increases the step-up ratio of the charge pump circuit 104 to 2.

However, in the above method, once the voltage of the battery decreases, the step-up ratio of the charge pump circuit 104 is increased. If the voltage of the battery increases again later, although ideally the step-up ratio of the charge pump circuit 104 should be decreased to maintain the voltage Vled at an optimum value, in the above method, the step-up ratio of the charge pump circuit 104 remains at the current high value, and this causes the light emission diode 110 to be over-driven by a large current.

Since the driving efficiency is low when the step-up ratio of the charge pump circuit 104 is large, it is desirable that the step-up ratio of the charge pump circuit 104 be as small as possible. However, in the related art, sometimes, the light emission diode 110, serving as a load, is driven with a large step-up ratio of the charge pump circuit 104, and in this case, the driving efficiency of the device is low.

For example, suppose the driving current of the light emission diode 110 can have an arbitrary value. In the period when the light emission diode 110 is driven to emit light by a large current, since the voltage of the battery decreases because of the large current, it is necessary to increase the voltage Vled, and hence, the threshold voltage Vth is set to be a high value. Consequently, the step-up ratio of the charge pump circuit 104 becomes insufficient; due to this, the step-up ratio of the charge pump circuit 104 is increased to drive the light emission diode 110. Afterward, when the driving current of the light emission diode 110 is decreased, the load current also decreases, and thus the voltage of the battery increases. Furthermore, since the threshold voltage Vth also decreases, a small step-up ratio of the charge pump circuit 104 is sufficient to drive the light emission diode 110. However, in the device shown in FIG. 7, the light emission diode 110 is still driven with the step-up ratio of the charge pump circuit 104 remaining a high value, and the driving efficiency of the device is significantly low.

On the other hand, if the device is configured so that the step-up ratio of the charge pump circuit 104 can be easily returned to a low value, when a motor requiring a large current is used in the portable apparatus, it ends up that the step-up ratio of the charge pump circuit 104 changes frequently, and brightness of the light emission diode 110 may fluctuate. To avoid this problem, conditions required for increasing the step-up ratio of the charge pump circuit 104 and conditions required for decreasing the step-up ratio of the charge pump circuit 104 are allowed to be changed to avoid frequent switching of the step-up ratio of the charge pump circuit 104.

With the conditions required for increasing or decreasing the step-up ratio of the charge pump circuit 104 being able to be changed, when changing the brightness of the light emission diode 110, in most cases, the brightness of the light emission diode 110 is lowered sequentially from a high value to a low value, and the brightness adjustment is finished when the brightness of the light emission diode 110 becomes a preset value. Since the brightness of the light emission diode 110 is set to be high at the beginning, a large current is required to drive the light emission diode 110, and the step-up ratio of the charge pump circuit 104 is set to be large. However, at the time the brightness adjustment is finished, even though a small step-up ratio of the charge pump circuit 104 is sufficient, as the conditions required for increasing the step-up ratio of the charge pump circuit 104 are different from the conditions required for decreasing the step-up ratio of the charge pump circuit 104, the step-up ratio of the charge pump circuit 104 remains to be a high value.

DISCLOSURE OF THE INVENTION

The present invention may solve one or more of problems of the related art.

A preferred embodiment of the present invention may provide a load driving circuit and a method of setting a load current of the load driving circuit allowing a charge pump circuit to operate at an optimum step-up ratio without frequently changing the step-up ratio of the charge pump circuit.

According to a first aspect of the present invention, there is provided a load driving circuit that supplies an electric current to a load formed of one or more light emission diodes to drive the load, comprising:

a step-up circuit that has a step-up ratio changeable according to an input control signal and supplies electric power to the load;

a current setting circuit configured to set a value of the electric current to be supplied to the load according to a load current setting signal input from outside;

a constant current circuit configured to generate and supply a constant electric current having the value set by the current setting circuit;

a determination circuit configured to determine whether the constant current circuit is able to supply the constant electric current; and a control circuit configured to control the step-up ratio of the step-up circuit according to the determination results of the determination circuit, wherein when the load current setting signal used for changing the value of the electric current is input, the current setting circuit sets the value of the electric current to be maximum, and decreases the value of the electric current step by step down to a predetermined value, and each time the current setting circuit reduces the value of the electric current by one step, the control circuit changes the step-up ratio of the step-up circuit according to the determination results of the determination circuit until the constant current circuit supplies the electric current having the current value set by the current setting circuit.

Preferably, when the current setting circuit changes the value of the electric current, the control circuit sets the step-up ratio of the step-up circuit to be minimum, and increases the step-up ratio sequentially step by step according to the determination results of the determination circuit until the constant current circuit supplies the electric current having the current value set by the current setting circuit.

Preferably, when the current setting circuit changes the value of the electric current, the control circuit increases the step-up ratio of the step-up circuit by one step or sustains a current step-up ratio of the step-up circuit according to the determination results of the determination circuit, decreases the step-up ratio of the step-up circuit by one step in a predetermined short time period, and increases the step-up ratio of the step-up circuit by one step to return to an original value or sustains the current step-up ratio according to the determination results of the determination circuit.

Preferably, the determination circuit is configured to apply a first condition for determining whether it is needed to increase the step-up ratio of the step-up circuit in order for the constant current circuit to perform constant-current operations, and a second condition for determining whether the constant current circuit is able to perform the constant-current operations even when the step-up ratio of the step-up circuit is decreased, and the control circuit controls the determination circuit to select one of the first condition and the second condition.

Preferably, the determination circuit includes:

a selection circuit configured to exclusively select one of a first reference voltage corresponding to the first condition and a second reference voltage corresponding to the second condition according to a control signal from the control circuit when the first reference voltage and the second reference voltage are input to the determination circuit;

a voltage comparison circuit configured to compare the one of the first reference voltage and the second reference voltage selected by the selection circuit with a voltage of a connection portion between the constant current circuit and the load, and to generate and output a comparison result signal, wherein the control circuit causes the first reference voltage to be output to the selection circuit when increasing the step-up ratio, causes the second reference voltage to be output to the selection circuit when decreasing the step-up ratio, and adjusts the step-up ratio according to the comparison result signal output from the voltage comparison circuit.

Preferably, the first reference voltage and the second reference voltage are changeable according to the value of the electric current set by the current setting circuit.

Preferably, the constant current circuit generates the changeable first reference voltage according to the value of the electric current set by the current setting circuit, and the determination circuit generates the second reference voltage from the first reference voltage generated by the constant current circuit.

Preferably, at a starting time, the control circuit sets the step-up ratio of the step-up circuit to be minimum, and increases the step-up ratio sequentially step by step according to the determination results of the determination circuit until the constant current circuit supplies the electric current having the current value set by the current setting circuit.

Preferably, the load current setting signal includes a number of consecutive pulses, said number corresponding to the current value set by the current setting circuit, the current setting circuit sets the value of the electric current to be maximum according to a first pulse of the load current setting signal, outputs a current setting signal to the control circuit indicating the value of the electric current is being adjusted, and decreases the value of the electric current step by step each time one of the pulses following the first pulse in the load current setting signal is input.

Preferably, the step-up circuit includes:

a charge pump circuit having a step-up ratio that is controlled by the control circuit; and a clamp circuit that clamps an upper limit voltage of an output voltage of the charge pump circuit to be a predetermined value, and outputs the clamped voltage.

According to a second aspect of the present invention, there is provided a load-current setting method of a load driving circuit for supplying an electric current to a load formed of one or more light emission diodes to drive the load, said load driving circuit including a step-up circuit that has a step-up ratio changeable according to an input control signal and supplies electric power to the load; and a current supplying circuit that sets a value of the electric current to be supplied to the load according to a load current setting signal input from outside, and generates and supplies a constant electric current having the setting value, the load-current setting method comprising the steps of:

setting the value of the electric current to be maximum when the load current setting signal used for changing the value of the electric current is input;

decreasing the value of the electric current step by step down to a predetermined value;

determining, each time the value of the electric current is decreased by one step, whether the constant electric current is able to be supplied to the load, and changing the step-up ratio according to the determination results until the electric current having the setting value is supplied to the load.

Preferably, when changing the value of the electric current, the step-up ratio of the step-up circuit is set to be minimum, and the step-up ratio is increased sequentially step by step according to the determination results until the electric current having the setting value is supplied to the load.

Preferably, when changing the value of the electric current, the step-up ratio of the step-up circuit is increased by one step or a current step-up ratio of the step-up circuit is sustained according to the determination results, the step-up ratio of the step-up circuit is decreased by one step in a predetermined short time period, and the step-up ratio of the step-up circuit is increased by one step and is returned to an original value or the current step-up ratio is sustained according to the determination results.

Preferably, a first condition for determining whether it is needed to increase the step-up ratio of the step-up circuit in order to supply the constant current to the load, and a second condition for determining whether the constant current is able to be supplied to the load even when the step-up ratio of the step-up circuit is decreased are applied, and one of the first condition and the second condition is selected for supplying the constant current to the load.

Preferably, one of a first reference voltage corresponding to the first condition and a second reference voltage corresponding to the second condition is exclusively selected, the selected one of the first reference voltage and the second reference voltage is compared with a voltage of a connection portion between the constant current supplying circuit and the load, the first reference voltage is selected when increasing the step-up ratio, the second reference voltage is selected when decreasing the step-up ratio, and the step-up ratio is adjusted according to results of the comparison.

Preferably, the first reference voltage and the second reference voltage are changeable according to the setting value of the electric current.

Preferably, at a starting time, the step-up ratio of the step-up circuit is set to be minimum, and the step-up ratio is increased sequentially step by step according to the determination results until the set constant current is supplied to the load.

Preferably, the load current setting signal includes a number of consecutive pulses, said number corresponding to the current value set by the current setting circuit, the value of the electric current is set to be maximum according to a first pulse of the load current setting signal, and the value of the electric current is decreased step by step each time one of the pulses following the first pulse in the load current setting signal is input.

According to the load driving circuit and the load-current setting method of the present invention, when the load current setting signal used for changing the value of the electric current is input, the value of the electric current is set to be maximum, and the value of the electric current is decreased step by step up to a predetermined value; each time the value of the electric current is decreased by one step, it is determined whether the constant electric current is able to be supplied to the load, and the step-up ratio is changed according to the determination results until the electric current having the setting value is supplied to the load. Due to this, it is possible to set an appropriate step-up ratio of the charge pump circuit after setting a load current without frequently changing the step-up ratio, and this prevents degradation of efficiency.

These and other objects, features, and advantages of the present invention will become more apparent from the following detailed description of preferred embodiments given with reference to the accompanying drawings.

BEST MODE FOR CARRYING OUT THE INVENTION

Below, preferred embodiments of the present invention are explained with reference to the accompanying drawings.

First Embodiment

Figure 1:
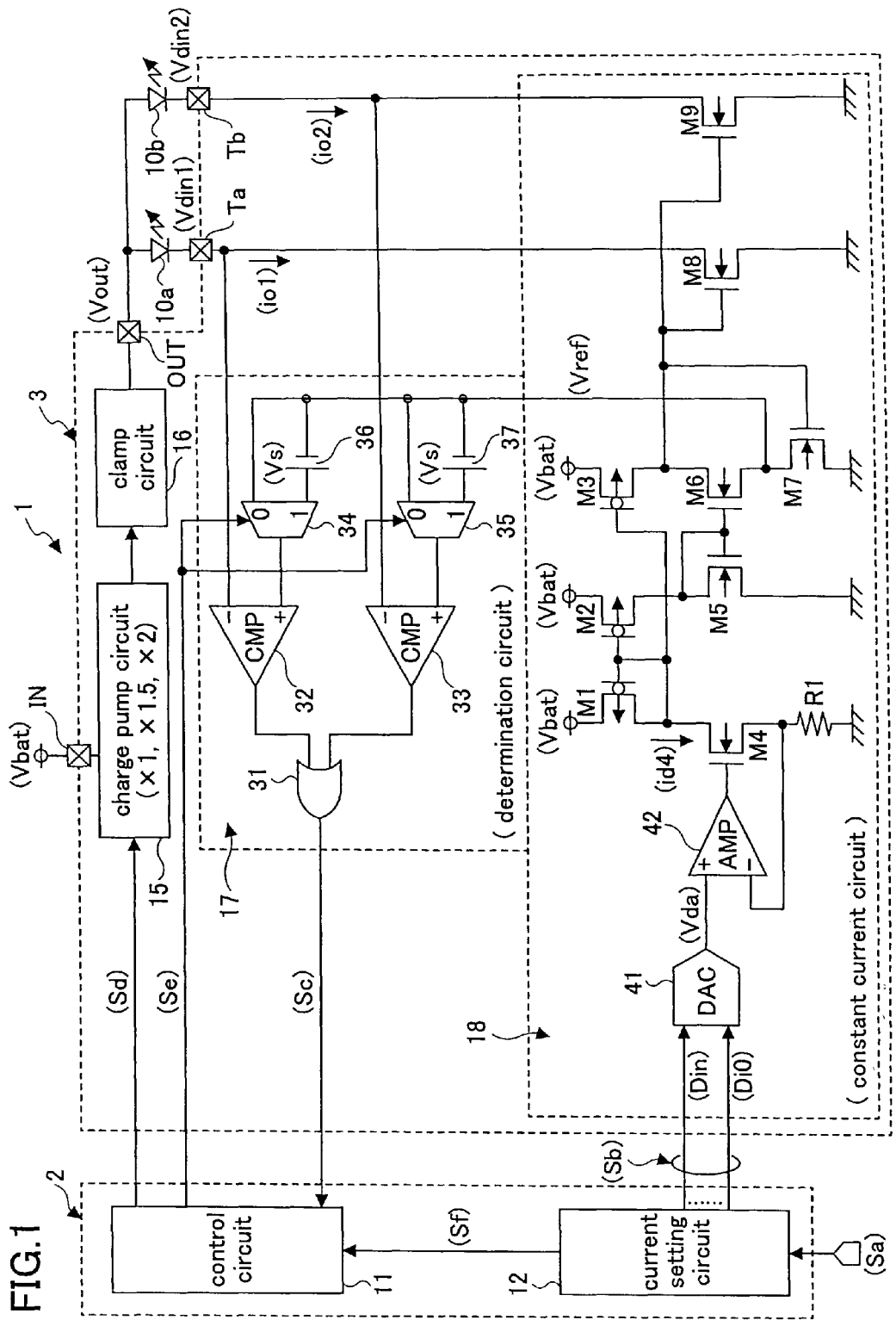
FIG. 1 is a circuit diagram exemplifying a load driving circuit according to a first embodiment of the present invention.

FIG. 1 is a circuit diagram exemplifying a load driving circuit according to a first embodiment of the present invention.

As shown in FIG. 1, a load driving circuit 1 boosts a power supply voltage Vbat input to an input terminal IN from a direct-current power supply, such as a battery, generates an output voltage Vout, and supplies the output voltage Vout to a light emission diode 10a and a light emission diode 10b through an output terminal OUT to drive the light emission diode 10a and the light emission diode 10b.

The load driving circuit 1 includes a logic circuit section 2 and an analog circuit section 3. The logic circuit section 2 includes a control circuit 11 and a current setting circuit 12. A load current setting signal Sa is input from outside to the current setting circuit 12.

The current setting circuit 12 outputs a signal Sf indicating current setting is being performed. For example, when operations for current setting are not being performed, the signal Sf is at a high level, and when operations for current setting are being performed, the signal Sf is at a low level. During the time period when operations for current setting is being performed, the low level signal Sf is output to the control circuit 11, and the load current setting signal Sa input from outside is converted to a current setting bit signal Sb including a number of (n+1) bit signals Di0 to Din.

The analog circuit section 3 includes a charge pump circuit 15, a clamp circuit 16, a determination circuit 17, and a constant current circuit 18.

The charge pump circuit 15 boosts the power supply voltage Vbat. The clamp circuit 16 clamps the output voltage of the charge pump circuit to be a preset value when the output signal of the charge pump circuit 15 is too high, and outputs the clamped voltage to the output terminal OUT.

The determination circuit 17 generates a step-up ratio control signal Sc and outputs the step-up ratio control signal Sc to the control circuit 11 when one of a voltage Vdin1 of a connection portion between the constant-current circuit 18 and the light emission diode 10a and a voltage Vdin2 of a connection portion between the constant-current circuit 18 and the light emission diode 10b is lower than a reference voltage. The determination circuit 17 includes an OR circuit 31, comparators 32, 33, selectors 34, 35, and power supplies 36, 37.

It should be noted that the control circuit 11 corresponds to the "control circuit" in claims of the present application, the current setting circuit 12 corresponds to the "current setting circuit" in claims of the present application, the charge pump circuit 15 and the clamp circuit 16 corresponds to the "step-up circuit" in claims of the present application, and the determination circuit 17 corresponds to the "determination circuit" in claims of the present application, the constant current circuit 18 corresponds to the "constant current circuit" in claims of the present application, the current setting circuit 12 and the constant current circuit 18 correspond to the "current supplying circuit" in claims of the present application. In addition, the selectors 34, 35 correspond to the "selection circuit" in claims of the present application, and the OR circuit 31 and the comparators 32, 33 correspond to the "voltage comparison circuit" in claims of the present application.

The constant current circuit 18 generates a constant electric current having the value corresponding to the current setting bit signal Sb, which is generated by the current setting circuit 12 in response to the load current setting signal Sa, and supplies the constant electric current to the light emission diodes 10a, 10b. The constant current circuit 18 includes a D/A converter 41, an operation amplifier 42, PMOS transistors M1 through M3, and NMOS transistors M4 through M9, and a resistor R1.

The current setting bit signal Sb is input to the D/A converter 41, and an output terminal of the D/A converter 41 is connected to a non-inverted input terminal of the operation amplifier 42.

The PMOS transistors M1 through M3 form a current mirror circuit, sources of the PMOS transistors M1 through M3 are connected to the power supply voltage Vbat, gates of the PMOS transistors M1 through M3 are connected to each other, and the connection portion of the gates of the PMOS transistors M1 through M3 is connected to the drain of the PMOS transistor M1.

The NMOS transistor M4 and the resistor R1 are connected in series between the drain of the PMOS transistor M1 and ground potential, the gate of the PMOS transistor M4 is connected to the output terminal of the operation amplifier 42, and the connection portion of the NMOS transistor M4 and the resistor R1 is connected to an inverted input terminal of the operation amplifier 42.

The NMOS transistor M5 is connected between the drain of the PMOS transistor M2 and ground potential. The gate of the NMOS transistor M5 is connected to the gate of the NMOS transistor M6, and the connection portion of the gate of the NMOS transistor M5 and the gate of the NMOS transistor M6 is connected to the drain of the NMOS transistor M5.

The NMOS transistor M6 and the NMOS transistor M7 are connected in series between the drain of the PMOS transistor M3 and ground potential, and the connection portion of the PMOS transistor M3 and the NMOS transistor M6 is connected to the gates of the NMOS transistors M7 through M9. The NMOS transistor M8 is connected between the connection terminal Ta and ground potential, and the NMOS transistor M9 is connected between the connection terminal Tb and ground potential. A first reference voltage Vref is extracted from the connection portion of the NMOS transistor M6 and the NMOS transistor M7.

The first reference voltage Vref is input to one of input terminals of each of the selectors 34, 35, a voltage equaling the first reference voltage Vref added to a voltage Vs of the power supply 36 is input to another input terminal of the selector 34, and a voltage equaling the first reference voltage Vref added to the voltage Vs of the power supply 37 is input to another input terminal of the selector 35. A condition selection signal Se from the control circuit 11 is input to control signal input terminals of the selectors 34, 35. When the condition selection signal Se at a low level is input to the selectors 34, 35, the selectors 34, 35 output the first reference voltage Vref, and when the condition selection signal Se at a high level is input to the selectors 34, 35, the selectors 34, 35 output a second reference voltage Vref, which equals the first reference voltage Vref added to the voltage Vs (Vref+Vs).

The output terminal of the selector 34 is connected to a non-inverted input terminal of the comparator 32, and the inverted input terminal of the comparator 32 is connected to the connection portion of the NMOS transistor M8 and the connection terminal Ta.

The output terminal of the selector 35 is connected to a non-inverted input terminal of the comparator 33, and the inverted input terminal of the comparator 33 is connected to the connection portion of the NMOS transistor M9 and the connection terminal Tb.

The output terminals of the comparators 32, 33 are connected to corresponding input terminals of the OR circuit 31, and a step-up ratio control signal Sc is output from the output terminal of the OR circuit 31 to the control circuit 11.

The power supply voltage Vbat is input to the charge pump circuit 15, the output voltage of the charge pump circuit 15 is clamped by the clamp circuit 16, and is output through the output terminal OUT. The anode of the light emission diode 10a and the anode of the light emission diode 10b are connected to the output terminal OUT, the cathode of the light emission diode 10a is connected to the connection terminal Ta, and the cathode of the light emission diode 10b is connected to the connection terminal Tb. A state transition signal Sd from the control circuit 11 is input to the charge pump circuit 15, and the step-up ratio of the charge pump circuit 15 is switched between 1, 1.5, and 2 according to the state transition signal Sd.

In the circuit as shown in FIG. 1, a load current io1 flowing through the light emission diode 10a and a load current io2 flowing through the light emission diode 10b are determined by an output voltage Vda of the D/A converter 41. The operation amplifier 42 controls gate voltages of the NMOS transistor M4 so that the voltage at the connection portion of the NMOS transistor M4 and the resistor R1 becomes the output voltage Vda of the D/A converter 41. For this reason, assuming the resistance of the resistor R1 is r1, a drain current id4 of the NMOS transistor M4 is expressed as below, $$id4=Vda/r1$$

and the drain current id4 also becomes the drain current of the PMOS transistor M1.

As described above, the PMOS transistors M1 through M3 form a current mirror circuit, and when at least the PMOS transistors M2, M3 have the same transistor characteristics, the drain current of the PMOS transistor M2 becomes equal to the drain current of the PMOS transistor M3, and further, the drain current of the PMOS transistor M2 and the drain current of the PMOS transistor M3 become proportional to the drain current id4 of the NMOS transistor M4. In addition, the drain current of the PMOS transistor M3 becomes the drain current of the NMOS transistor M6 and the drain current of the NMOS transistor M7. Since gate-source voltages of the NMOS transistors M7 through M9 are the same, the drain current of the NMOS transistor MB and the drain current of the NMOS transistor M9, which serve as driving transistors, also become proportional to the drain current id4 of the NMOS transistor M4; hence the constant-current circuit 18 is able to drive each of the light emission diode 10a and the light emission diode 10b with a constant current.

In order to drive the NMOS transistor MB and the NMOS transistor M9 with a constant current, the drain voltage Vdin1 of the NMOS transistor M8 and the drain voltage Vdin2 of the NMOS transistor M9 should be greater than or equal to the first reference voltage Vref, which is the drain voltage of the NMOS transistor M7. This is because when the drain voltage Vdin1 of the NMOS transistor M8 and the drain voltage Vdin2 of the NMOS transistor M9 are less than the first reference voltage Vref, the NMOS transistor M8 and the NMOS transistor M9 are in saturation mode and cannot carry out constant-current operations.

Due to this, the drain voltage Vdin1 of the NMOS transistor M8 is compared with the first reference voltage Vref in the comparator 32, the drain voltage Vdin2 of the NMOS transistor M9 is compared with the first reference voltage Vref in the comparator 33, and when at least one of the drain voltage Vdin1 of the NMOS transistor M8 and the drain voltage Vdin2 of the NMOS transistor M9 is less than the first reference voltage Vref, the step-up ratio control signal Sc output from the OR circuit 31 is set to a high level. Then the control circuit 11 uses the state transition signal Sd to increase the step-up ratio of the charge pump circuit 15 by one level, thus increasing the output voltage Vout.

Next, descriptions are made of determination operations of the control circuit 11 for determining whether the step-up ratio of the charge pump circuit 15 should be decreased.

In this case, the control circuit 11 decreases the current step-up ratio of the charge pump circuit 15 by one level, and outputs the second reference voltage Vref, which equals the first reference voltage Vref added to the voltage Vs (Vref+Vs), to the selectors 34, 35. Under this condition, when output signals of the comparators 32, 33 are at the low level, and the OR circuit 31 outputs a low level step-up ratio control signal Sc, the control circuit 11 determines that even when the step-up ratio of the charge pump circuit 15 is decreased by one level, the light emission diode 10a and the light emission diode 10b can still be driven by a constant current, and sustains the state in which the current step-up ratio of the charge pump circuit 15 is decreased by one level. For example, the voltage Vs is about 0.3 Volts.

In contrast, when output signals of the comparators 32, 33 are at the high level, the control circuit 11 outputs the state transition signal Sd which indicates that the step-up ratio of the charge pump circuit 15 should be returned to the original value. Since this determination operation only uses a very short time period, flicker of the light amount of the light emission diode 10a and the light emission diode 10b cannot be perceived by human eyes. Due to this, when at least one of the drain voltage Vdin1 of the NMOS transistor MB and the drain voltage Vdin2 of the NMOS transistor M9, which serve as driving transistors, is less than the first reference voltage Vref, the control circuit 11 increases the step-up ratio of the charge pump circuit 15. When the drain voltage Vdin1 of the NMOS transistor M8 and the drain voltage Vdin2 of the NMOS transistor M9, which serve as driving transistors, are greater than or equal to the second reference voltage (Vref+Vs), the control circuit 11 decreases the step-up ratio of the charge pump circuit 15.

Next, operations of the load driving circuit 1 as shown in FIG. 1 are described.

Figure 2:
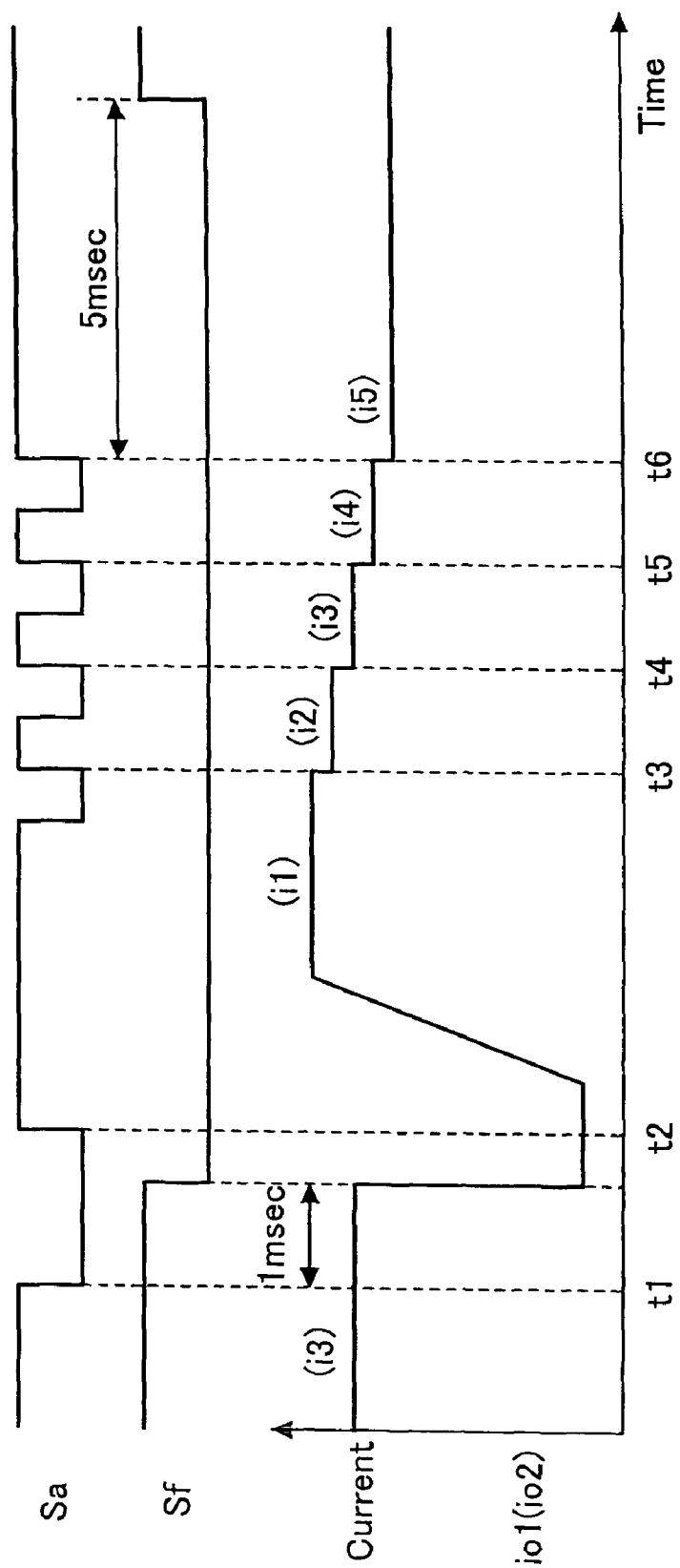
FIG. 2 is a timing chart illustrating operations of the load driving circuit 1 according to the present embodiment.

FIG. 2 is a timing chart illustrating operations of the load driving circuit 1 according to the present embodiment.

Specifically, FIG. 2 illustrates a method of setting the load-current io1 and the load-current io2, which are driving currents of the light emission diode 10a and the light emission diode 10b, respectively, according to the load current setting signal Sa.

Note that in FIG. 2, it is assumed that the load current io1 and the load current io2 are respectively changed from a current value i3 to a current value i5.

In FIG. 2, the load current setting signal Sa is at the low level at time t1, and when this state continues for about 1 ms or longer, the current setting circuit 12 sets the signal Sf to the low level, informs the control circuit 11 that setting the load current is being performed, and generates and outputs the current setting bit signal Sb so that the load current io1 and the load current io2 become the maximum current value i1.

When receiving the signal Sf at the low level, the control circuit 11 stops operations of the charge pump circuit 15 temporarily, increases the step-up ratio of the charge pump circuit 15 to a maximum, for example, 2, and then resumes operations of the charge pump circuit 15. The charge pump circuit 15 has a soft-start circuit (not illustrated), and at this moment, the output current of the charge pump circuit 15 increases at a certain slope, and along with this, the load current io1 and the load current io2 also increase at certain slopes.

At time t2, the load current setting signal Sa rises to the high level, and remains the high level until the load current io1 and the load current io2 become the maximum current value i1. The current setting circuit 12 converts the setting value of the current obtained according to the load current setting signal Sa to the current setting bit signal Sb, and outputs the thus obtained current setting bit signal Sb to the D/A converter 41. The driving currents of the light emission diode 10a and the light emission diode 10b are determined by the output voltage Vda of the D/A converter 41.

In this way, because the setting value from the current setting circuit 12 is the maximum current value i1 immediately after the load current setting signal Sa falls down to the low level, when the charge pump circuit 15 starts operations, the maximum current value i1 is supplied to the light emission diode 10a and the light emission diode 10b.

When the load current setting signal Sa rises to the high level again at time t3 after the load current setting signal Sa is at the low level in a time period shorter than 1 ms, the current setting circuit 12 sets the current setting value to be i2, which is the second largest current value next to the maximum current value i1, and the value of the current supplied to the light emission diode 10a and the light emission diode 10b is changed to i2.

When the load current setting signal Sa rises to the high level again at time t4 after the load current setting signal Sa is at the low level in a time period shorter than 1 ms, the current setting circuit 12 sets the current setting value to be i3, which is next to the current value i2, and the value of the current supplied to the light emission diode 10a and the light emission diode 10b is changed to i3.

Similarly, when the load current setting signal Sa rises to the high level again at time t5 after the load current setting signal Sa is at the low level in a time period shorter than 1 ms, the current setting circuit 12 sets the current setting value to be i4, which is next to the current value i3, and the value of the current supplied to the light emission diode 10a and the light emission diode 10b is changed to i4.

Further, when the load current setting signal Sa rises to the high level again at time t6 after the load current setting signal Sa is at the low level in a time period shorter than 1 ms, the current setting circuit 12 sets the current setting value to be i5, which is next to the current value i4, and the value of the current supplied to the light emission diode 10a and the light emission diode 10b is changed to i5.

Afterward, when the load current setting signal Sa remains at the high level for about 5 ms, the current setting circuit 12 determines that the operations of setting the load current are completed, and sets the signal Sf to the high level.

In this way, when setting the currents supplied to the light emission diode 10a and the light emission diode 10b, the value of the current supplied to the light emission diode 10a and the light emission diode 10b is decreased step by step from the largest one. Due to this, the power supply voltage Vbat rises while the load current io1 and the load current io2 fall. As a result, when it is sufficient that the step-up ratio of the charge pump circuit 15 be small, the control circuit 11 decreases the step-up ratio of the charge pump circuit 15 as described above.

Figure 3:
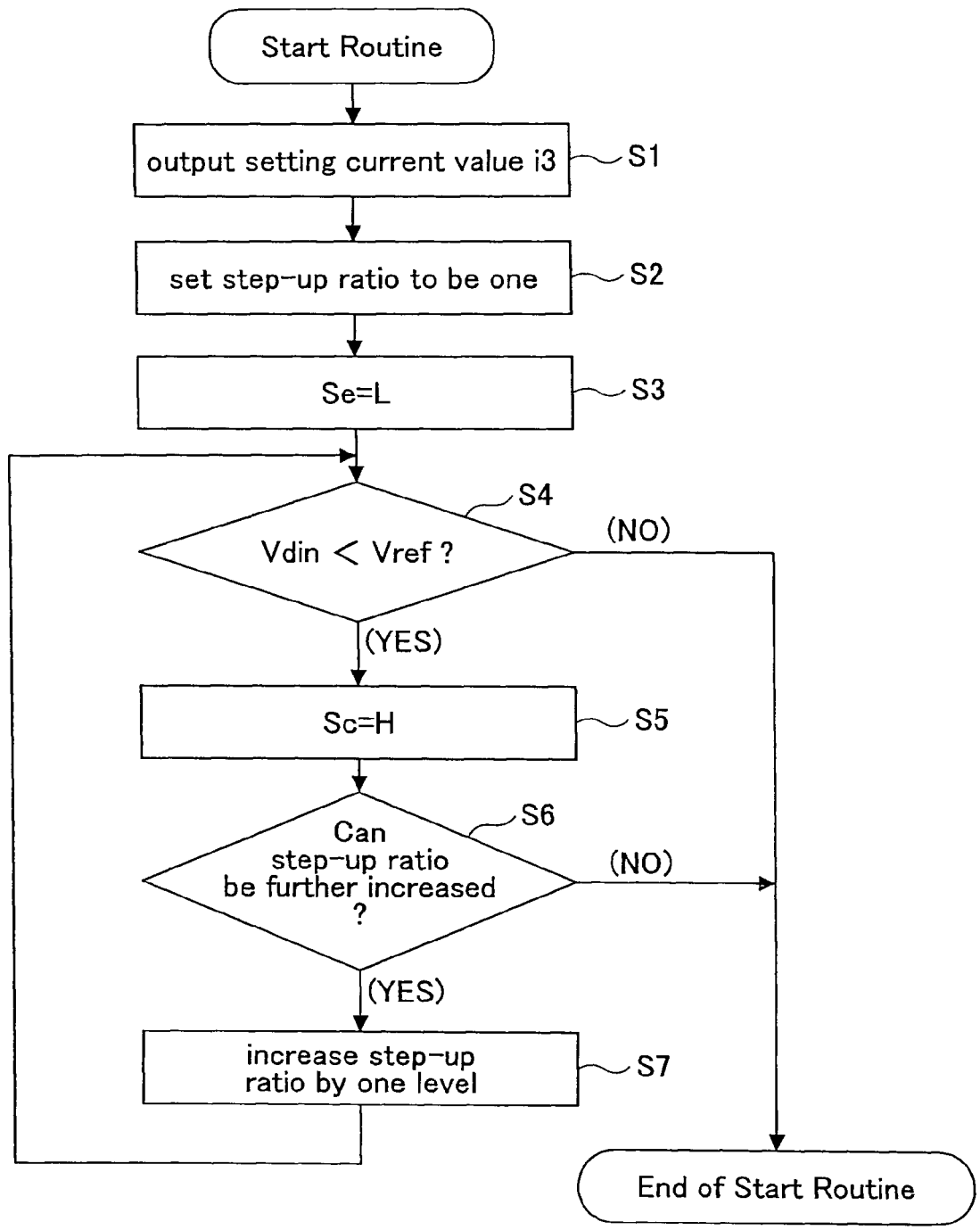
FIG. 3 is a flowchart illustrating operations of the load driving circuit 1 at the starting time according to the present embodiment.

FIG. 3 is a flowchart illustrating operations of the load driving circuit 1 at the starting time according to the present embodiment.

Specifically, FIG. 3 illustrates operations of inputting the power supply voltage Vbat to the circuit shown in FIG. 1 to power on the circuit, and setting values of the load current io1 and the load current io2.

Here, it is assumed the current value i3 is set in the current setting circuit 12.

In FIG. 3, when the power supply voltage Vbat is input to the input terminal IN, a starting routine as shown in FIG. 3 is executed.

In step S1, the current setting circuit 12 generates the current setting bit signal Sb indicating the setting current value i3, and outputs the current setting bit signal Sb to the D/A converter 41.

In step S2, the control circuit 11 sets the step-up ratio of the charge pump circuit 15 to be the minimum value (namely, 1).

In step S3, the control circuit 11 sets the condition selection signal Se at the low level, and directs the selectors 34, 35 to output the first reference voltage Vref.

Since the current value i3 is set in the current setting circuit 12, in the constant-current circuit 18, gate voltages of the NMOS transistors M8 and M9 are controlled so that the load current io1 and the load current io2 having the current value i3 are supplied to the light emission diode 10a and the light emission diode 10b.

In step S4, according to output signals of the comparator 32 and the comparator 33, when it is determined that at least one of the drain voltage Vdin1 of the NMOS transistor M8 and the drain voltage Vdin2 of the NMOS transistor M9 is less than the first reference voltage Vref (YES), the routine proceeds to step S5.

Otherwise, when it is determined that the drain voltage Vdin1 of the NMOS transistor M8 and the drain voltage Vdin2 of the NMOS transistor M9 are both greater than the first reference voltage Vref (NO), the routine is over.

Note that in step S4 in FIG. 3, "Vdin<Vref" means that at least one of the drain voltage Vdin1 of the NMOS transistor MB and the drain voltage Vdin2 of the NMOS transistor M9 is less than the first reference voltage Vref.

In step S5, the OR circuit 31 sets the step-up ratio control signal Sc to the high level.

In step S6, the control circuit 11 determines whether the step-up ratio of the charge pump circuit 15 is not the maximum value, That is, whether the step-up ratio of the charge pump circuit 15 can be further increased.

When the step-up ratio of the charge pump circuit 15 is not equal to the maximum value (YES), that is, the step-up ratio of the charge pump circuit 15 can be further increased, the routine proceeds to step S7.

Otherwise, when the step-up ratio of the charge pump circuit 15 is equal to the maximum value (NO), that is, the step-up ratio of the charge pump circuit 15 cannot be further increased, the routine is finished.

In step S7, the control circuit 11 outputs the state transition signal Sd which directs increasing the step-up ratio of the charge pump circuit 15 by one level. Then, the routine goes back to step S4.

Below, the method of setting the load current in the load driving circuit 1 is described specifically.

Figure 4:
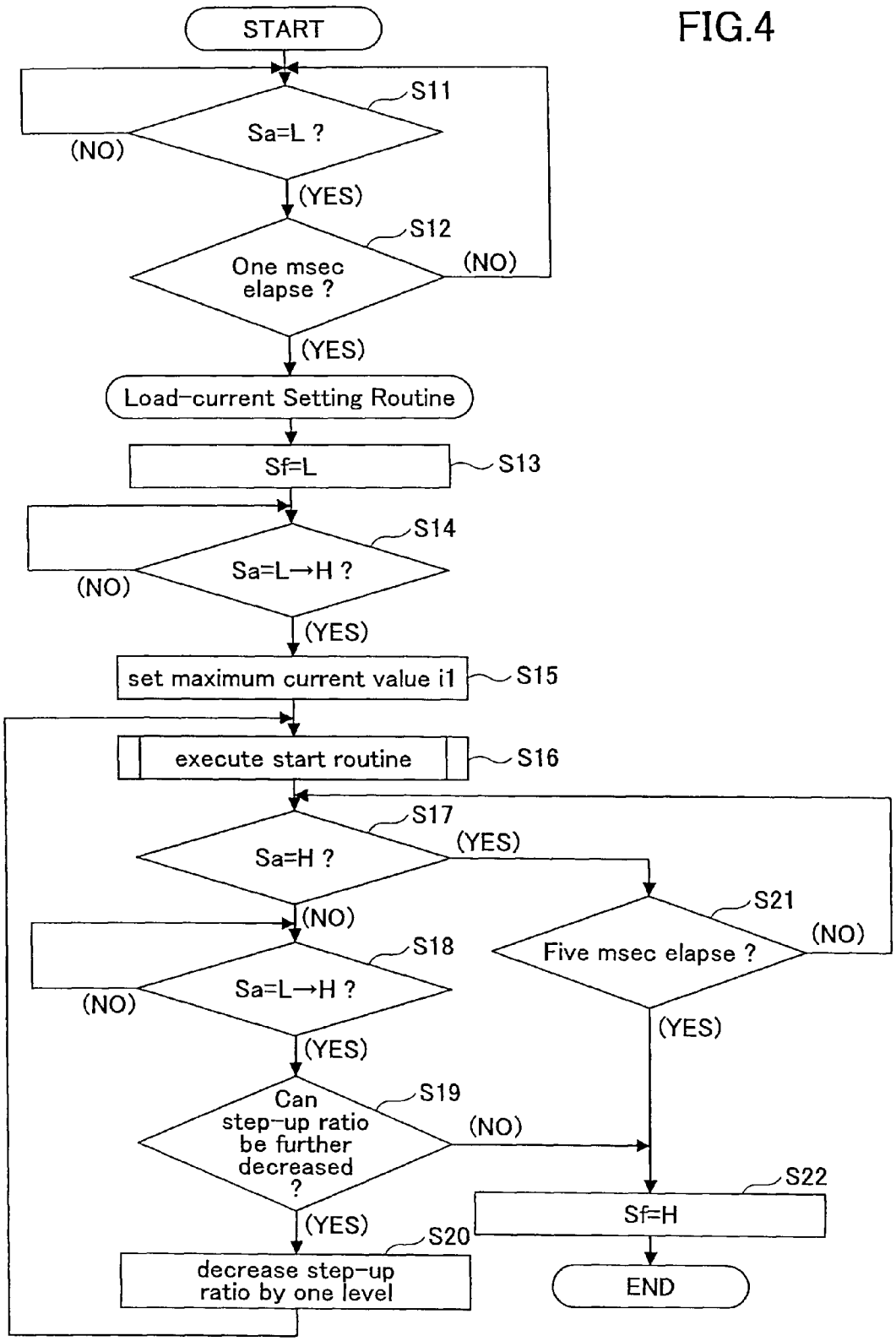
FIG. 4 is a flowchart illustrating a method of setting the load current in the load driving circuit 1 according to the present embodiment.

FIG. 4 is a flowchart illustrating a method of setting the load current in the load driving circuit 1 according to the present embodiment.

As shown in FIG. 4, in step S1, the current setting circuit 12 determines whether the load current setting signal Sa falls from the high level to the low level.

When the current setting circuit 12 determines that the load current setting signal Sa does not fall to the low level (NO), the current setting circuit 12 repeats the operation in step S11. A low level load current setting signal Sa corresponds to the state at the time t1 in FIG. 2.

When the current setting circuit 12 determines that the load current setting signal Sa falls from the high level to the low level (YES), the routine proceeds to step S12.

In step S12, the current setting circuit 12 further determines whether the load current setting signal Sa has been at the low level for 1 ms or longer.

When the current setting circuit 12 determines that the load current setting signal Sa has been at the low level for 1 ms or longer (YES), the routine of setting the load current starts.

Otherwise, when the current setting circuit 12 determines that the load current setting signal Sa has not been at the low level for 1 ms or longer (NO), the routine returns to step S1.

In step S13, when the routine of setting the load current starts, the current setting circuit 12 sets the signal Sf to the low level, and informs the control circuit 11 that setting the load current is being performed.

In step S14, the current setting circuit 12 determines whether the load current setting signal Sa rises from the low level to the high level.

When the current setting circuit 12 determines that the load current setting signal Sa does not rise from the low level to the high level (NO), the current setting circuit 12 repeats the operation in step S14.

Otherwise, when the current setting circuit 12 determines that the load current setting signal Sa rises from the low level to the high level (YES), the routine proceeds to step S15.

In step S15, the current setting circuit 12 sets the current setting value to be the maximum current value i1.

In step S16, step 2 through step S7 in the starting routine as shown in FIG. 3 are executed.

In step S17, when the starting routine is finished, the current setting circuit 12 determines whether the load current setting signal Sa is at the high level.

When the current setting circuit 12 determines that the load current setting signal Sa is not at the high level (NO), the routine proceeds to step S18.

Otherwise, when the current setting circuit 12 determines that the load current setting signal Sa is at the low level (YES), the routine proceeds to step S21.

In step S18, the current setting circuit 12 determines whether the load current setting signal Sa rises from the low level to the high level.

When the current setting circuit 12 determines that the load current setting signal Sa does not rise from the low level to the high level (NO), the current setting circuit 12 repeats the operation in step S18.

Otherwise, when the current setting circuit 12 determines that the load current setting signal Sa rises from the low level to the high level (YES), the routine proceeds to step S19.

In step S19, the current setting circuit 12 determines whether the current setting value can be further decreased.

When the current setting circuit 12 determines that the current setting value can be further decreased (YES), the routine proceeds to step S20.

Otherwise, when the current setting circuit 12 determines that the current setting value cannot be further decreased (NO), the routine proceeds to step S22.

In step S20, the current setting circuit 12 decreases the current setting value by one level, and the routine returns to step S16.

In step S21, since the current setting circuit 12 determines that the load current setting signal Sa is at the low level in step S17, the current setting circuit 12 further determines whether the load current setting signal Sa has been at the high level for 5 ms.

When the current setting circuit 12 determines that the load current setting signal Sa has not been at the high level for 5 ms (NO), the routine returns to step S17.

Otherwise, when the current setting circuit 12 determines that the load current setting signal Sa has been at the high level for 5 ms (YES), the routine proceeds to step S22.

In step S22, the current setting circuit 12 sets the signal Sf to the high level, and informs the control circuit 11 that setting of the load current is completed, and then the routine is finished.

As described above, according to the load driving circuit 1 in the present embodiment, when setting the load current by using a number of consecutive pulses, each time the operation of load current setting is performed, the same operations as the starting operations are carried out; therefore it is possible to set an appropriate step-up ratio after the operation of load current setting, and this prevents degradation of efficiency.

Second Embodiment

In the first embodiment, each time the operation of load current setting is carried out, operations the same as the starting operations are carried out. In the present embodiment, the step-up ratio is decreased in a short time period, and it is determined whether the step-up ratio can be further decreased. The conditions of this determination are the same as those at the time when increasing the step-up ratio for setting the load current.

Note that the load driving circuit of the present embodiment is the same as the load driving circuit 1 in the first embodiment, hence the description of the circuit configuration and operations of the load driving circuit of the present embodiment are omitted. In addition, starting operations of the present embodiment are the same as those shown in FIG. 3, hence detailed descriptions are omitted.

Figure 5:
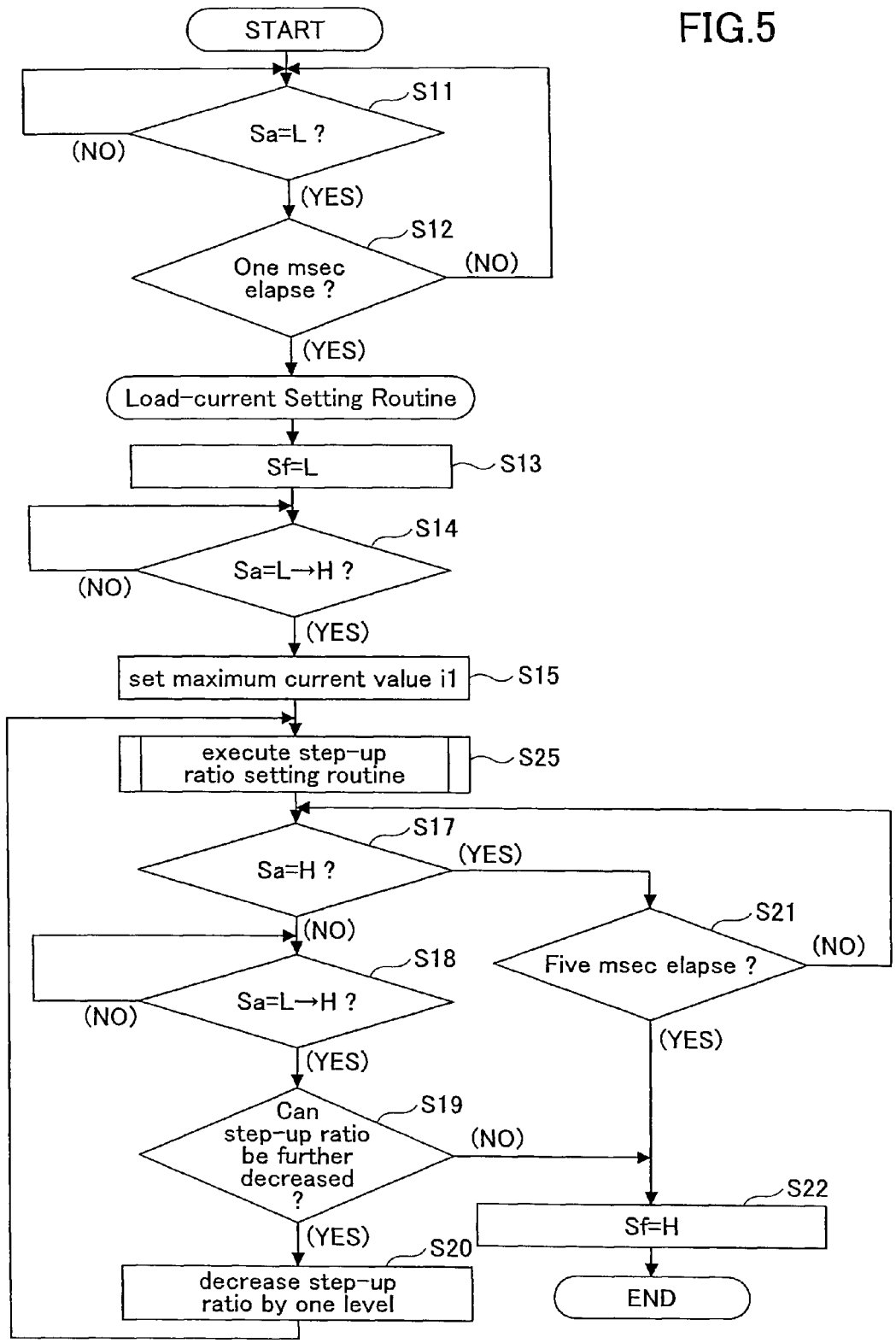
FIG. 5 is a flowchart illustrating a method of setting the load current in the load driving circuit 1 according to the present embodiment.

FIG. 5 is a flowchart illustrating a method of setting the load current in the load driving circuit 1 according to the present embodiment.

In FIG. 5, the same reference numbers are assigned to the same steps as those shown in FIG. 4, and overlapping descriptions are omitted. Below, only differences between FIG. 5 and FIG. 4 are described.

Operations shown in FIG. 5 differ from operations shown in FIG. 4 in that the starting routine executed in step S16 in FIG. 4 is replaced by a step-up ratio setting routine executed in step S25 in FIG. 5.

Figure 6:
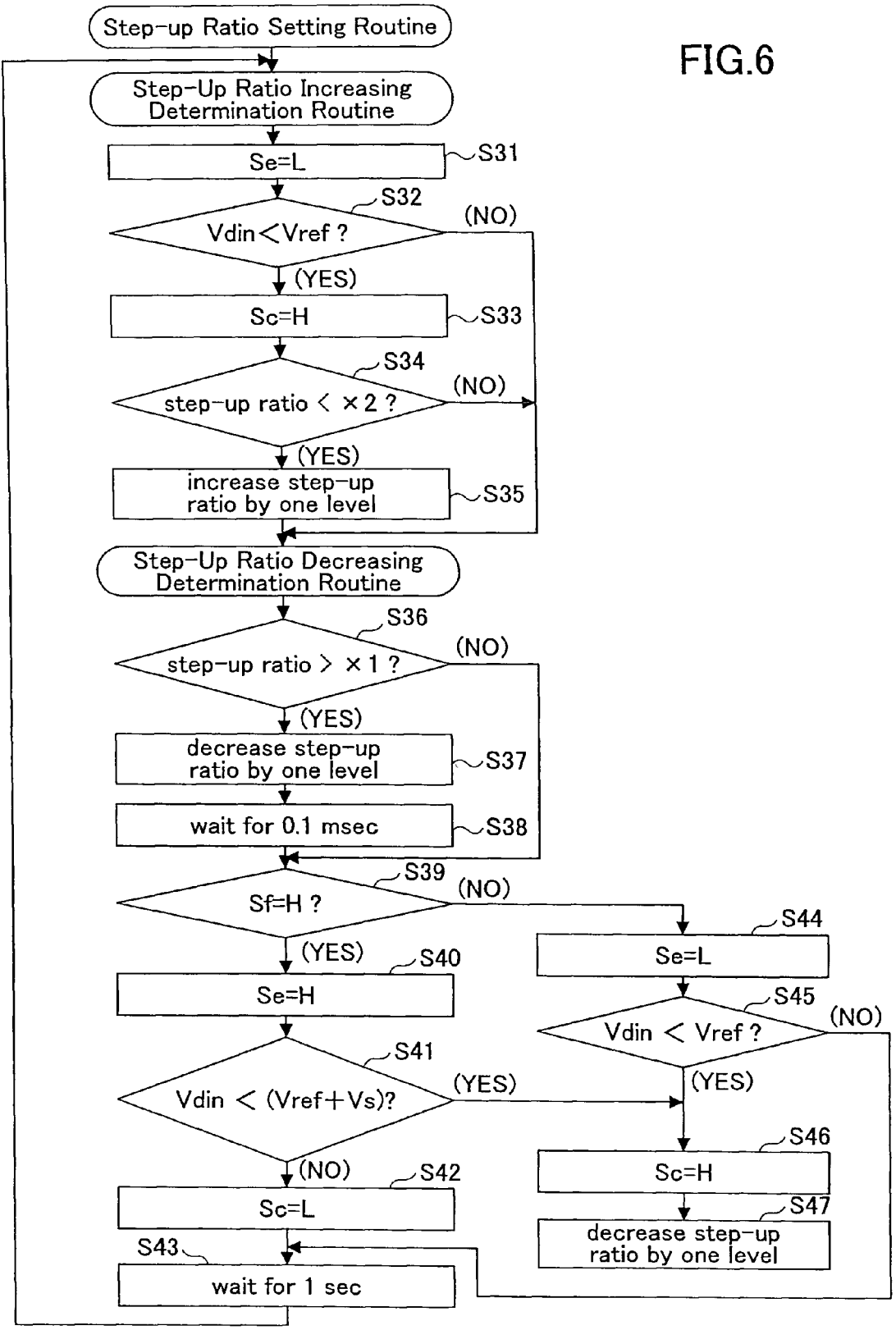
FIG. 6 is a flowchart exemplifying the step-up ratio setting routine executed in step S25 in FIG. 5.
Figure 7:
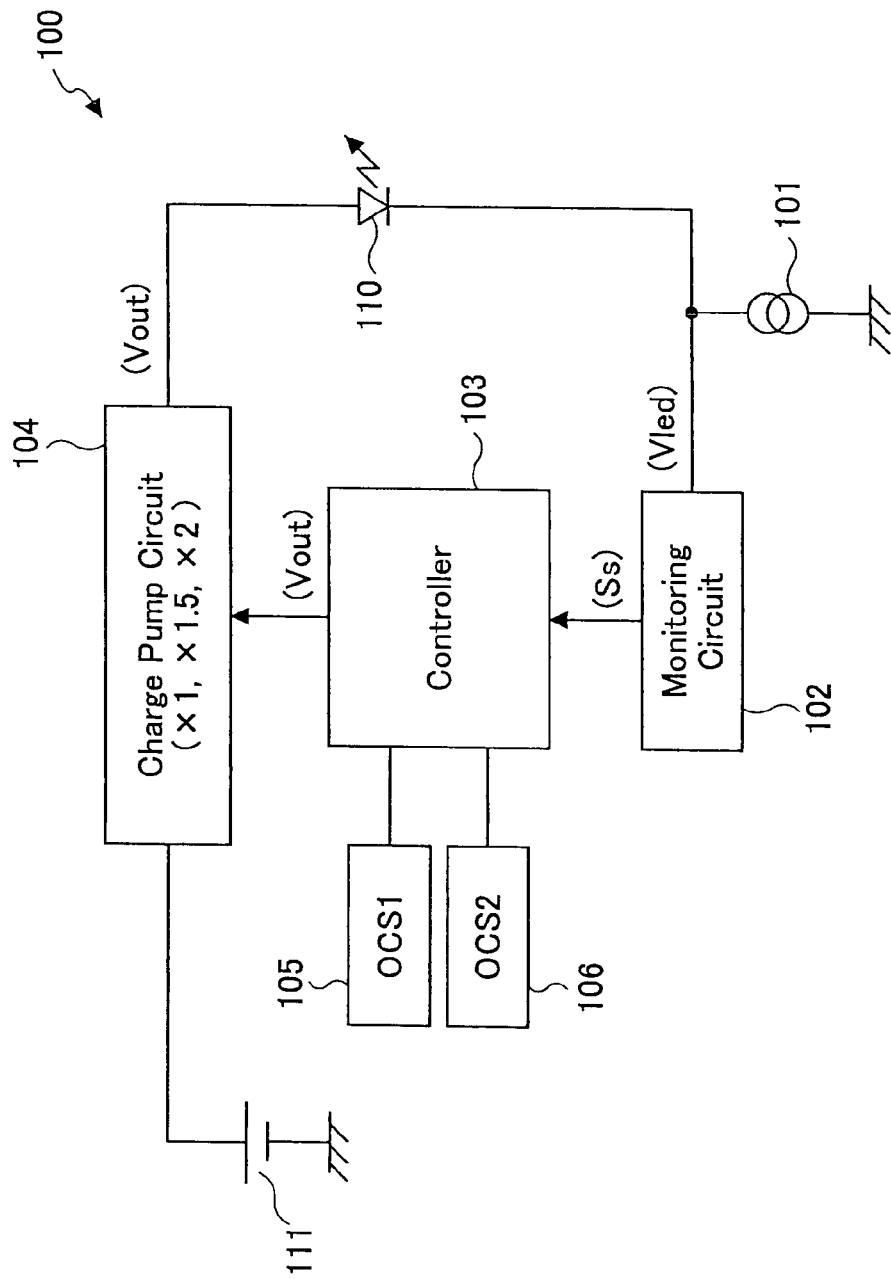
FIG. 7 is diagram illustrating a configuration of a power supply device in the related art.

FIG. 6 is a flowchart exemplifying the step-up ratio setting routine executed in step S25 in FIG. 5.

The step-up ratio setting routine shown in FIG. 6 includes a step-up ratio increasing determination routine for determining whether the step-up ratio should be increased, and a step-up ratio decreasing determination routine for determining whether the step-up ratio should be decreased.

In the step-up ratio setting routine, first, the step-up ratio increasing determination routine is executed.

When the step-up ratio increasing determination routine is started, in step S31, the control circuit 11 sets the condition selection signal Se at the low level, and directs the selectors 34, 35 to output the first reference voltage Vref. The comparator 32 and the comparator 33 compare the drain voltage Vdin1 of the NMOS transistor M8 and the drain voltage Vdin2 of the NMOS transistor M9, respectively, with the first reference voltage Vref.

In step S32, the determination circuit 17 determines whether at least one of the drain voltage Vdin1 of the NMOS transistor M8 and the drain voltage Vdin2 of the NMOS transistor M9 is less than the first reference voltage Vref.

When the determination circuit 17 determines that at least one of the drain voltage Vdin1 of the NMOS transistor MB and the drain voltage Vdin2 of the NMOS transistor M9 is less than the first reference voltage Vref (YES), the routine proceeds to step S33.

Otherwise, when the determination circuit 17 determines that the drain voltage Vdin1 of the NMOS transistor MB and the drain voltage Vdin2 of the NMOS transistor M9 are both greater than the first reference voltage Vref (NO), the step-up ratio increasing determination routine is finished, and the step-up ratio decreasing determination routine is started.

In step S33, the determination circuit 17 sets the step-up ratio control signal Sc to the high level.

In step S34, the control circuit 11 determines whether the current step-up ratio of the charge pump circuit 15 is less than the maximum value, namely, 2.

When the control circuit 11 determines that the current step-up ratio of the charge pump circuit 15 is less than the maximum value 2 (YES), the routine proceeds to step S35.

When the control circuit 11 determines that the current step-up ratio of the charge pump circuit 15 is equal to the maximum value 2 (NO), that is, the step-up ratio cannot be further increased, the step-up ratio increasing determination routine is finished, and the step-up ratio decreasing determination routine is started.

In step S35, the control circuit 11 increases the step-up ratio of the charge pump circuit 15 by one level, and then starts the step-up ratio decreasing determination routine.

When the step-up ratio decreasing determination routine is started, in step S36, the control circuit 11 determines whether the current step-up ratio of the charge pump circuit 15 is greater than the minimum value, namely, 1.

When the control circuit 11 determines that the current step-up ratio of the charge pump circuit 15 is greater than the minimum value, namely, 1 (YES), the routine proceeds to step S37.

When the control circuit 11 determines that the current step-up ratio of the charge pump circuit 15 is equal to the minimum value 1 (NO), that is, the step-up ratio cannot be further decreased, the routine proceeds to step S39.

In step S37, the control circuit 11 decreases the step-up ratio of the charge pump circuit 15 by one level.

In step S38, the control circuit 11 waits for 0.1 ms so that the output signal of the charge pump circuit 15 becomes stable.

In step S39, the control circuit 11 determines whether the signal Sf indicating setting of the load current is being carried out is at the high level.

When the control circuit 11 determines that the signal Sf is at the high level, the routine proceeds to step S40.

Otherwise, when the control circuit 11 determines that the signal Sf is at the low level, the routine proceeds to step S44.

In step S40, the control circuit 11 sets the condition selection signal Se at the high level, and directs the selectors 34, 35 to output the second reference voltage Vref, which equals the first reference voltage Vref added to the voltage Vs (Vref+Vs). The comparator 32 and the comparator 33 compare the drain voltage Vdin1 of the NMOS transistor M8 and the drain voltage Vdin2 of the NMOS transistor M9, respectively, with the second reference voltage (Vref+Vs).

In step S41, the determination circuit 17 determines whether at least one of the drain voltage Vdin1 of the NMOS transistor M8 and the drain voltage Vdin2 of the NMOS transistor M9 is less than the second reference voltage (Vref+Vs).

When the determination circuit 17 determines that the drain voltage Vdin1 of the NMOS transistor M8 and the drain voltage Vdin2 of the NMOS transistor M9 are both greater than the second reference voltage (Vref+Vs) (NO), the routine proceeds to step S42.

Otherwise, when the determination circuit 17 determines that at least one of the drain voltage Vdin1 of the NMOS transistor M8 and the drain voltage Vdin2 of the NMOS transistor M9 is less than the second reference voltage (Vref+Vs) (YES), the routine proceeds to step S46.

In step S42, the determination circuit 17 sets the step-up ratio control signal Sc to the low level, and the control circuit 11 sustains the decreased step-up ratio of the charge pump circuit 15.

In step S43, the control circuit 11 waits for 1 second to proceed to the step-up ratio increasing determination routine to repeat the step-up ratio increasing determination routine and the step-up ratio decreasing determination routine.

In step S44, since the signal Sf is at the low level, the control circuit 11 sets the condition selection signal Se at the low level, and directs the selectors 34, 35 to output the first reference voltage Vref. The comparator 32 and the comparator 33 compare the drain voltage Vdin1 of the NMOS transistor M8 and the drain voltage Vdin2 of the NMOS transistor M9, respectively, with the first reference voltage Vref.

In step S45, the determination circuit 17 determines whether at least one of the drain voltage Vdin1 of the NMOS transistor M8 and the drain voltage Vdin2 of the NMOS transistor M9 is less than the first reference voltage Vref.

When the determination circuit 17 determines that at least one of the drain voltage Vdin1 of the NMOS transistor M8 and the drain voltage Vdin2 of the NMOS transistor M9 is less than the first reference voltage Vref (YES), the routine proceeds to step S46.

Otherwise, when the determination circuit 17 determines that the drain voltage Vdin1 of the NMOS transistor M8 and the drain voltage Vdin2 of the NMOS transistor M9 are both greater than the first reference voltage Vref (NO), the routine proceeds to step S43.

In step S46, the determination circuit 17 sets the step-up ratio control signal Sc to the high level.

In step S47, the control circuit 11 increases the step-up ratio of the charge pump circuit 15 by one level to return to the original step-up ratio.

As described above, in the step-up ratio setting routine shown in FIG. 6, it is determined every one second whether the step-up ratio of the charge pump circuit 15 should be increased or decreased, and determination conditions for the load current setting in the step-up ratio decreasing determination routine as shown in step S45 are the same as those in the step-up ratio increasing determination routine as shown in step S52. Due to this, even when the step-up ratio of the charge pump circuit 15 is low, it is possible to drive the light emission diode 10a and the light emission diode 10b, and this prevents the light emission diode 10a and the light emission diode 10b from being driven always at a high step-up ratio.

In the load driving circuit of the present embodiment, the step-up ratio is decreased in a short time period, and it is determined whether the step-up ratio can be further decreased. The conditions of this determination are the same as those at the time wherein increasing the step-up ratio for setting the load current. Therefore, it is possible to set an appropriate step-up ratio after the operation of load current setting, and this prevents degradation of efficiency.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

For example, in the above embodiments, the descriptions are made assuming two light emission diodes 10a and 10b are driven, but the present invention is not limited to this. The present invention is also applicable to the case in which one or more loads are driven, and the number of the loads determines the number of comparators, selectors, power supplies, input terminals of the OR circuit of the determination circuit 17 in FIG. 1, and the number of the drive transistors in the constant current circuit 18 in FIG. 1. However, when there is only one load, the output signal of the comparator becomes the step-up ratio control signal Sc.

This patent application is based on Japanese Priority Patent Application No. 2007-159879 filed on Jun. 18, 2007, the entire contents of which are hereby incorporated herein by reference.

The invention claimed is:

1. A load driving circuit that supplies an electric current to a load formed of one or more light emission diodes to drive the load, comprising:
   a step-up circuit that has a step-up ratio changeable according to an input control signal and supplies electric power to the load;

a current setting circuit configured to set a value of the electric current to be supplied to the load according to a load current setting signal input from outside;

a constant current circuit configured to generate and supply a constant electric current having the value set by the current setting circuit;

a determination circuit configured to determine whether the constant current circuit is able to supply the constant electric current; and a control circuit configured to control the step-up ratio of the step-up circuit according to determination results of the determination circuit;

wherein when the load current setting signal used for changing the setting value of the electric current is input, the current setting circuit sets the value of the electric current to be maximum, and decreases the setting value of the electric current step by step down to a predetermined value, and each time the current setting circuit decreases the setting value of the electric current by one step, the control circuit changes the step-up ratio of the step-up circuit according to the determination results of the determination circuit until the constant current circuit supplies the electric current having the current value set by the current setting circuit.

2. The load driving circuit as claimed in claim 1, wherein when the current setting circuit changes the setting value of the electric current, the control circuit sets the step-up ratio of the step-up circuit to be minimum, and increases the step-up ratio sequentially step by step according to the determination results of the determination circuit until the constant current circuit supplies the electric current having the current value set by the current setting circuit.

3. The load driving circuit as claimed in claim 1, wherein when the current setting circuit changes the setting value of the electric current, the control circuit increases the step-up ratio of the step-up circuit by one step or sustains a current step-up ratio of the step-up circuit according to the determination results of the determination circuit, decreases the step-up ratio of the step-up circuit by one step in a predetermined short time period, and increases the step-up ratio of the step-up circuit by one step to return to an original value or sustains the current step-up ratio according to the determination results of the determination circuit.

4. The load driving circuit as claimed in claim 2, wherein the determination circuit is configured to apply a first condition for determining whether it is needed to increase the step-up ratio of the step-up circuit in order for the constant current circuit to perform constant-current operations, and a second condition for determining whether the constant current circuit is able to perform the constant-current operations even when the step-up ratio of the step-up circuit is decreased, and the control circuit controls the determination circuit to select one of the first condition and the second condition.

5. The load driving circuit as claimed in claim 4, wherein the determination circuit includes:

a selection circuit configured to exclusively select one of a first reference voltage corresponding to the first condition and a second reference voltage corresponding to the second condition according to a control signal from the control circuit when the first reference voltage and the second reference voltage are input to the determination circuit; and a voltage comparison circuit configured to compare the one of the first reference voltage and the second reference voltage selected by the selection circuit with a voltage of a connection portion between the constant current circuit and the load, and to generate and output a comparison result signal; and the control circuit causes the first reference voltage to be output to the selection circuit when increasing the step-up ratio, and causes the second reference voltage to be output to the selection circuit when decreasing the step-up ratio, and adjusts the step-up ratio according to the comparison result signal output from the voltage comparison circuit.

6. The load driving circuit as claimed in claim 5, wherein the first reference voltage and the second reference voltage are changeable according to the value of the electric current set by the current setting circuit.

7. The load driving circuit as claimed in claim 6, wherein the constant current circuit generates the changeable first reference voltage according to the value of the electric current set by the current setting circuit, and the determination circuit generates the second reference voltage from the first reference voltage generated by the constant current circuit.

8. The load driving circuit as claimed in claim 1, wherein at a starting time, the control circuit sets the step-up ratio of the step-up circuit to be minimum, and increases the step-up ratio sequentially step by step according to the determination results of the determination circuit until the constant current circuit supplies the electric current having the current value set by the current setting circuit.

9. The load driving circuit as claimed in claim 1, wherein the load current setting signal includes a number of consecutive pulses, said number corresponding to the current value set by the current setting circuit, the current setting circuit sets the value of the electric current to be maximum according to a first pulse of the load current setting signal, outputs a current setting signal to the control circuit indicating the value of the electric current is being adjusted, and decreases the value of the electric current step by step each time one of the pulses following the first pulse in the load current setting signal is input.

10. The load driving circuit as claimed in claim 1, wherein the step-up circuit includes:

a charge pump circuit having a step-up ratio that is controlled by the control circuit; and a clamp circuit that clamps an upper limit voltage of an output voltage of the charge pump circuit to be a predetermined value, and outputs the clamped voltage.

11. A load current setting method of a load driving circuit for supplying an electric current to a load formed of one or more light emission diodes to drive the load, said load driving circuit including a step-up circuit that has a step-up ratio changeable according to an input control signal and supplies electric power to the load; and a current supplying circuit that sets a value of the electric current to be supplied to the load according to a load current setting signal input from outside, and generates and supplies a constant electric current having the set value, the load current setting method comprising the steps of:

setting the value of the electric current to be maximum when the load current setting signal used for changing the value of the electric current is input;

decreasing the value of the electric current step by step down to a predetermined value;

determining, each time the value of the electric current is decreased by one step, whether the constant electric current is able to be supplied to the load, and changing the step-up ratio according to the determination results until the electric current having the setting value is supplied to the load.

12. The load-current setting method as claimed in claim 11, wherein when changing the value of the electric current, the step-up ratio of the step-up circuit is set to be minimum, and the step-up ratio is increased sequentially step by step according to the determination results until the electric current having the setting value is supplied to the load.

13. The load-current setting method as claimed in claim 11, wherein when changing the value of the electric current, the step-up ratio of the step-up circuit is increased by one step or a current step-up ratio of the step-up circuit is sustained according to the determination results, the step-up ratio of the step-up circuit is decreased by one step in a predetermined short time period, and the step-up ratio of the step-up circuit is increased by one step and is returned to an original value or the current step-up ratio is sustained according to the determination results.

14. The load-current setting method as claimed in claim 12, wherein a first condition for determining whether it is needed to increase the step-up ratio of the step-up circuit in order to supply the constant current to the load, and a second condition for determining whether the constant current is able to be supplied to the load even when the step-up ratio of the step-up circuit is decreased are applied, and one of the first condition and the second condition is selected for supplying the constant current to the load.

15. The load-current setting method as claimed in claim 14, wherein one of a first reference voltage corresponding to the first condition and a second reference voltage corresponding to the second condition is exclusively selected, the selected one of the first reference voltage and the second reference voltage is compared with a voltage of a connection portion between the constant current supplying circuit and the load, the first reference voltage is selected when increasing the step-up ratio, the second reference voltage is selected when decreasing the step-up ratio, and the step-up ratio is adjusted according to results of the comparison.

16. The load-current setting method as claimed in claim 15, wherein the first reference voltage and the second reference voltage are changeable according to the setting value of the electric current.

17. The load-current setting method as claimed in claim 11, wherein at a starting time, the step-up ratio of the step-up circuit is set to be minimum, and the step-up ratio is increased sequentially step by step according to the determination results until the set constant current is supplied to the load.

18. The load-current setting method as claimed in claim 11, wherein the load current setting signal includes a number of consecutive pulses, said number corresponding to the current value set by the current setting circuit, the value of the electric current is set to be maximum according to a first pulse of the load current setting signal, and the value of the electric current is decreased step by step each time one of the pulses following the first pulse in the load current setting signal is input.

* * * * *